United States Patent [19]

Brenholt

[11] 4,299,604
[45] Nov. 10, 1981

[54] AIR INDUCER AND BACKWASHER FOR AN AIR CLEANER

[75] Inventor: David L. Brenholt, Dundas, Minn.

[73] Assignee: Donaldson Company, Inc., Minneapolis, Minn.

[21] Appl. No.: 153,176

[22] Filed: May 27, 1980

[51] Int. Cl.³ .................. B01D 46/04; F04F 5/52
[52] U.S. Cl. .................................. 55/303; 55/468; 417/197; 294/64 A
[58] Field of Search ............... 55/265, 303, 468; 417/197; 294/64 A, 64 B

[56] References Cited

U.S. PATENT DOCUMENTS

| | | | |
|---|---|---|---|
| 3,169,038 | 2/1965 | Pendleton | 55/468 |
| 3,680,285 | 8/1972 | Wellan et al. | 55/302 |
| 3,729,903 | 5/1973 | Espeel et al. | 55/283 |
| 3,748,836 | 7/1973 | Bachle | 55/302 |
| 3,798,878 | 3/1974 | Pausch | 55/96 |
| 4,033,732 | 7/1977 | Axelsson et al. | 55/96 |
| 4,073,602 | 2/1978 | Cagle | 417/185 |
| 4,077,781 | 3/1978 | Sundström | 55/96 |

*Primary Examiner*—David L. Lacey
*Attorney, Agent, or Firm*—Merchant, Gould, Smith, Edell, Welter & Schmidt

[57] ABSTRACT

An air cleaner assembly (10) which includes a mechanism (14) for inducing the flow of air through the air cleaner (10) and for backwashing a filter element (18) is disclosed. A filtering chamber (28) is defined between the interior of a housing (12) and an exterior of a tubular shaped filter element (18). The mechanism (14) includes an air inlet plenum (32) and an accumulator chamber (34). Pressurized fluid is supplied to the plenum (32) through an inlet (54). To induce the flow of particulate laden air through the filter element (18), the pressurized fluid passes through an outlet (52) from the air inlet plenum (32). A flexible wall or diaphragm (42) is moved upwardly under the influence of the pressurized fluid supplied to the air inlet plenum (32) and moves wall member (44) upwardly into sealing engagement with top wall member (48). In this position, a portion of the pressurized fluid bleeds through holes (58) into the accumulator chamber (34) to be stored therein. When pressurized fluid is no longer supplied to air inlet plenum (32), the flexible wall (42) moves downwardly and a gap is formed between the top edge of wall member (44) and top wall member (48). The accumulated pressurized air thereafter rushes from accumulator chamber (34) in a reverse direction to backwash the filter element (18).

13 Claims, 6 Drawing Figures

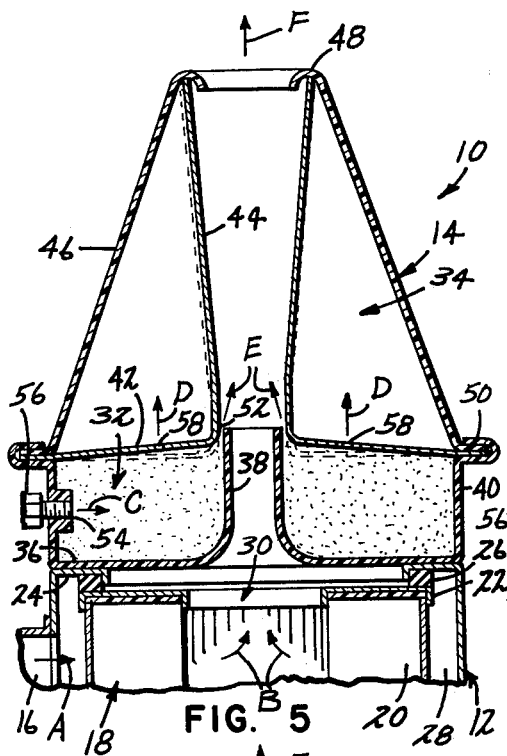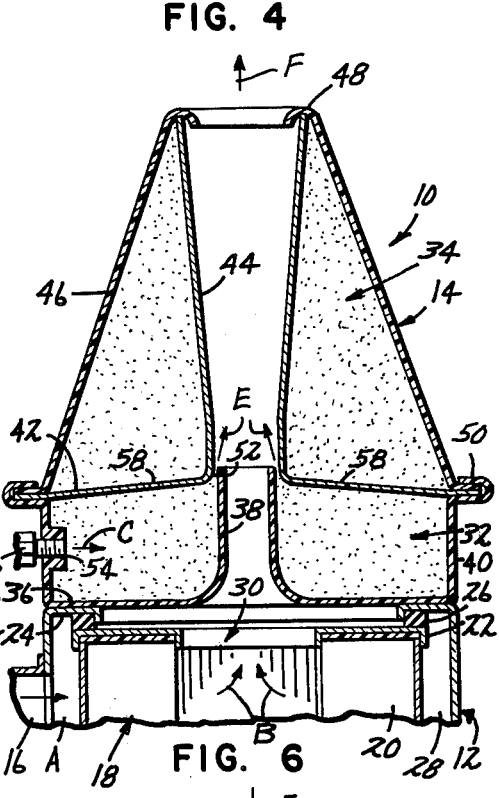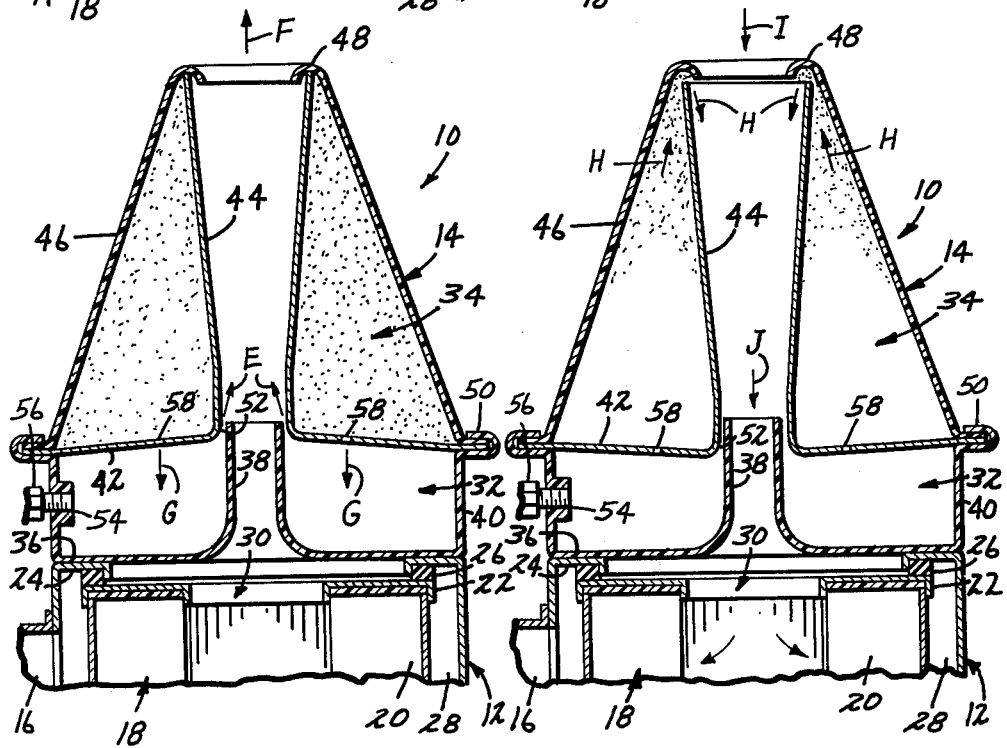

AIR INDUCER AND BACKWASHER FOR AN AIR CLEANER

TECHNICAL FIELD

The present invention is directed to an air cleaner assembly for removing particulate material from air. More particularly, the present invention is directed to a mechanism for inducing an air flow through a filter element and for backwashing filtered particulate material from the filter element.

BACKGROUND OF THE INVENTION

Numerous air cleaning or filtering mechanisms are known in the prior art. Broadly described, these air cleaning mechanisms function by interposing a porous medium within the air flow to separate particulate material therefrom. The porous medium has been configured as a hollow tubular filter element in a number of prior art devices. Cotton sateen with an internal wire mesh separater and pleated paper have been used in some prior art filtering devices as the porous media for the tubular filter elements. The filter elements remove the the particulate material from the air stream by allowing the particulate material to deposit on a surface of the tubular filter element. The collected particulate material must be periodically removed from the filter element.

A common technique for removing the collected particulate material from the filter elements is backwashing, or reverse jet pulsing. In this technique, a blast of pressurized fluid is sent through the filter element in a direction reverse to the direction of travel of the air being cleaned. The blast of pressurized fluid causes the collected particulate material to dislodge from the surface of the filter element.

The prior art filtering devices which utilize the backwashing technique to periodically clean filter elements use a mechanism discrete from the backwashing mechanism for causing the air flow through the filtering device. A backwashing mechanism of the prior art is typically comprised of separate conduits or piping and associated control valves. Filtering devices which use the backwash technique are disclosed in U.S. Pat. No. 3,729,903, issued to Espeel et al. on May 1, 1973; U.S. Pat. No. 3,798,878 issued to Pausch on Mar. 26, 1974; U.S. Pat. No. 4,077,781 issued to Sundstrom on Mar. 7, 1978; and British Pat. No. 1,516,721 issued to Donaldson Company, Inc. As will be seen more fully hereinafter, the present invention combines the backwash and air inducing functions into a single mechanism, thus simplifying the filtering device and allowing it to be more compactly constructed.

SUMMARY OF THE INVENTION

An air flow inducing and reverse pulse cleaning device for use with particulate material filter elements is disclosed. The device includes an air inlet plenum which has an inlet for receiving pressurized fluid and an outlet for directing the pressurized fluid past an outlet opening of a filter element to induce the flow of particulate laden air through the filter element. An accumulator chamber stores a portion of the pressurized fluid which is being supplied; and a bleed means diverts a portion of the pressurized fluid from the air inlet plenum to the accumulator chamber. A control mechanism blocks the flow of the pressurized fluid accumulated in the accumulator chamber while the pressurized fluid is being supplied to the air inlet plenum and releases the accumulated pressurized fluid from the accumulator chamber in a direction reverse to the direction of flow of the pressurized fluid from the outlet of the inlet plenum. In this manner, the filter element is backwashed by the accumulated pressurized fluid.

In the preferred embodiment, the air inlet plenum is generally annular in shape and is supported coaxially above the outlet opening from a filter element. The accumulator chamber is supported above the air inlet plenum and takes on the general configuration of a ring-shaped cone. A ring-shaped wall or diaphragm serves as a common wall of both the air inlet plenum and the accumulator chamber. At least one hole is formed through the flexible wall to serve as the bleed means for diverting a portion of the pressurized fluid from the air inlet plenum to the accumulator chamber.

The flexible wall is flexed upwardly when pressurized fluid is supplied to the air inlet plenum. An inner wall of the accumulator chamber extends upwardly from the flexible wall. The inner wall is moved upwardly to seal against an upper wall of the accumulator chamber when the flexible wall is flexed upwardly. In this manner, a portion of the pressurized fluid being supplied to the accumulator chamber is diverted to and accumulates within the accumulator chamber. Simultaneously, a larger portion of the pressurized fluid being supplied to the air inlet plenum passes outwardly of a ring-shaped outlet from the air inlet plenum. The pressurized fluid passing from the ring-shaped outlet induces a flow of particulate laden air through the filter device and filter element.

When pressurized fluid is no longer supplied to the air inlet plenum, the flexible wall moves downwardly and moves the inner wall of the accumulator chamber away from the top wall thereof. The top wall of the accumulator chamber is configured to direct the accumulated pressurized fluid in a direction reverse to the normal flow of air from the filter element to thereby backwash the particulate material from the filter element.

The present invention also serves as an air inducer. The pressurized fluid which is supplied through the air inlet plenum, in addition to being the source of backwashing fluid, functions as an air flow inducing force, and thereby eliminating the requirement of a fan and a motor. Also, the accumulator chamber eliminates the requirement of a separate backwashing mechanism and piping. The use of the flexible wall of the accumulator chamber to automatically discharge the accumulated pressurized fluid eliminates the requirement of a complex control and valving system for a backwashing mechanism. A single power source, such as a compressed air line, which can be connected to the on and off switch of a primary machine from which the particulate material is being drawn, such as router grinder, sander, or saw, is the only power source required.

Various advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

FIG. 3 is a view taken generally along lines 3—3 of FIG. 1 illustrating the device of the present invention when pressurized fluid is initially applied to the air inlet plenum;

FIG. 4 is a view similar to FIG. 3 illustrating a steady state operating mode of the device;

FIG. 5 is a view similar to FIG. 3 illustrating the operative mode of the device at the point where pressurized fluid is initially cut off from the air inlet plenum; and FIG. 6 is a view similar to FIG. 3 illustrating the operative mode of the device wherein the flexible wall has flexed downwardly and the accumulated pressurized fluid is being discharged from the accumulator chamber in a reverse direction.

DETAILED DESCRIPTION OF THE INVENTION

Figure 1:
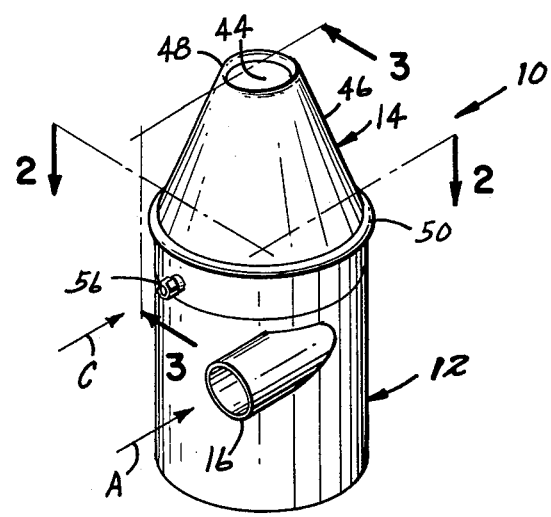
FIG. 1 is a perspective view of an air filtering mechanism in accordance with the present invention.
Figure 2:
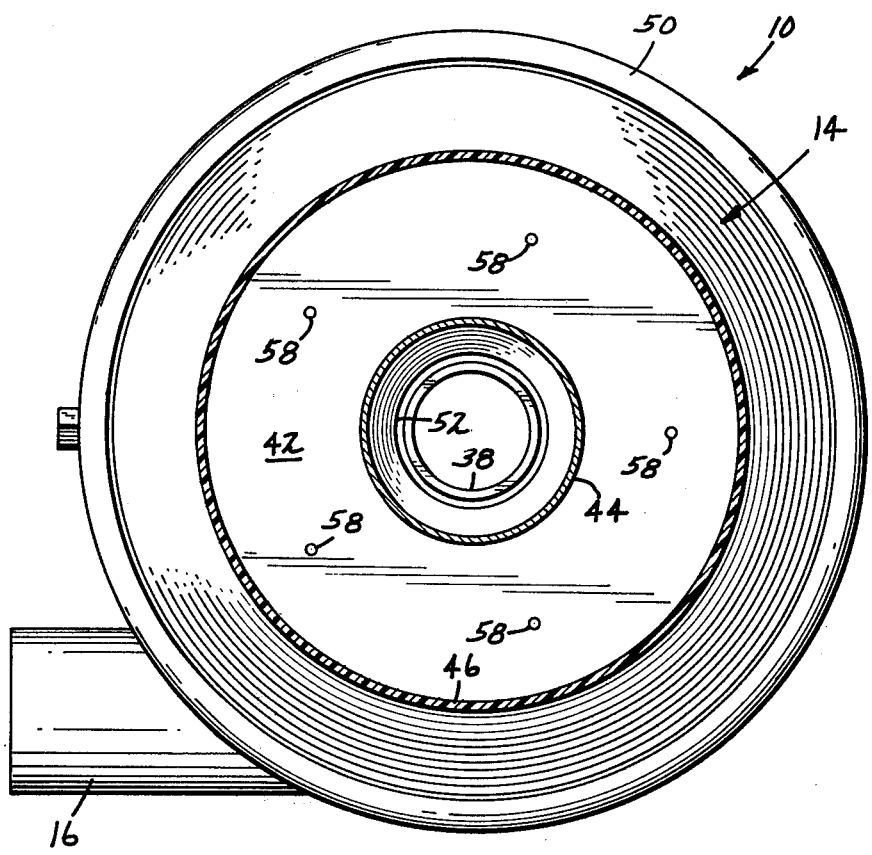
FIG. 2 is a view taken generally along lines 2—2 of FIG. 1.

Referring to the drawings in detail, wherein like numerals indicate like elements, there is shown in FIG. 1 an air cleaning apparatus designated generally as 10. The apparatus 10 includes a generally cylindrical shaped housing 12 and an air flow inducing and reverse pulse cleaning device 14 supported thereabove.

An inlet pipe 16 serves as an inlet to the housing 12 for particulate laden air. The inlet pipe 16 can be connected by means of a conduit (not shown) to an area from which particulate laden air is to be drawn. For example, adjacent a shop tool such as a router, grinder, sander, or saw. A tubular shaped filter element 18 is supported within the housing 12. The filter element 18 is preferably a pleated paper filter comprised of porous paper material having a plurality of pleats 20 formed into the shape of a cylinder. The longitudinal end of the filter element 18 which is not shown is closed. An annular cover 22 is secured to the top end of the filter element 18. The annular cover 22 is in turn attached to an inwardly extending annular flange 24 of the housing 12. A gasket 26 is interposed between the cover 22 and the flange 24 to form an airtight seal therebetween. The area between the housing 12 and the exterior surface of the filter element 18 defines a filtering chamber 28. As indicated by arrow A, particulate laden air enters the filtering chamber 28 through the inlet pipe 16. Thereafter, the air passes through the filter element 18 into the hollow interior defined by the pleats 20. As indicated by arrows B, the air passes upwardly and out of the hollow interior defined by the filter element 18. An outlet opening 30 from the element 18 is defined by an inner edge of the annular cover 22.

The air flow inducing and reverse pulse cleaning device 14 includes an air inlet plenum 32 and an accumulator chamber 34. The air inlet plenum 32 is defined by a plurality of wall members including an annular or ring-shaped bottom wall member 36, an inner cylindrical shaped wall member 38, an outer cylindrical shaped wall member 40, and a flexible wall member or diaphragm 42. The accumulator chamber 34 is defined by an inner upright wall member 44, an outer upright wall member 46, a top wall member 48, and the flexible wall member 42.

The wall members 36, 38, and 40 are preferably formed of a single integral piece of material, for example a molded plastic material. The wall members 46 and 48 are also preferably formed of a single piece of material, such as molded plastic. Finally, the flexible wall member or diaphragm 42 and the wall member 44 are also preferably made of a single piece of material. It has been found that thin stainless steel functions well as a flexible diaphragm.

A U-shaped lip 50 is formed around the top edge of wall member 40. The outer edge of flexible member 42 and an outwardly extending flange of upright wall member 46 are held in the U-shaped lip 50. The accumulator chamber 34 is thus disposed directly above the air inlet plenum 32.

The inner wall member 38 is generally cylindrical in shape. A ring-shaped outlet 52 from the air inlet plenum 32 is formed in a gap between the upper end of the wall member 38 and the wall members 42, 44. The gap 52 and the lower end of the inner wall member 44 form a venturi section for the pressurized air exiting the outlet 52. Above the venturi section, the wall member 44 extends upwardly and outwardly. The outer wall member 46 of the accumulator chamber 34 extends upwardly and inwardly from an outer perimeter of the flexible wall member 42 so that the accumulator chamber 34 takes on the shape of a hollowed-out truncated cone. The top wall member 48 extends inwardly from the outer wall member 46 and inwardly and downwardly of the upper end of the inner wall member 44. As will be more fully explained hereinafter, the top wall member 48 serves as a flow director or guide for air exiting the accumulator chamber 34. An air inlet hole 54 is formed through the outer wall member 40 of the air inlet plenum 32. A coupling 56 connects the inlet opening 54 to a conduit connected to a source of pressurized fluid, such as air. A plurality of bleed holes 58 provide communication between the air inlet plenum 32 and the accumulator chamber 34.

The operation of the air cleaning apparatus 10 will be described with reference to FIGS. 3–6 wherein the various operative modes of the apparatus are diagrammatically illustrated. FIG. 3 illustrates the apparatus 10 when pressurized air is initially started or applied to the plenum 32 through inlet opening 54, as indicated by arrow C. As the pressurized air is initially applied, the flexible wall member 42 flexes upwardly and carries the inner wall member 44 with it. In the upwardly flexed state of the flexible wall member 42, the upper edge of the wall member 44 forms a seal against the top wall member 48. As the pressurized air is supplied to the inlet plenum 32, a small amount of the air is diverted or bleeds through the holes 58 into the accumulator chamber 34, as illustrated by arrows D. Since the gap 52 is larger than the holes 58, a major portion of the pressurized air supplied to the air inlet plenum 32 exits through the ring-shaped outlet opening 52, as illustrated by arrows E. The hollow interior of the inner wall member 38 is supported coaxially above the hollow interior of filter element 18. The pressurized air exiting the opening 52 causes a draw of the particulate laden air through inlet pipe 16, and thereafter draws the filtered air through the hollow interior of filter element 18. The filtered air and the pressurized air thereafter exit through the hollow interior of wall member 44 of the accumulator chamber 34 as illustrated by arrow F.

FIG. 4 illustrates the steady state operating mode of the apparatus 10. In this state, pressurized air continues to be supplied to the air inlet plenum 32. Pressurized air continues to exit the air inlet plenum 32 and air continues to be drawn through the inlet pipe 16 and filter element 18. The accumulator chamber 34, however, has been filled with pressurized air and pressure on either side of the flexible diaphragm 42 has been equalized. No additional pressurized air flows through the bleed holes 58. The surface area below wall member 42, upon which the pressurized air acts, is larger than the surface area of the wall member 42 within the accumulator chamber 44. The flexible wall member 42 therefore remains in its upwardly flexed state during the steady-state operating mode of the apparatus 10.

FIG. 5 illustrates the condition wherein the source of pressurized air to the plenum 32 is initially shut off; and FIG. 6 illustrates the state of the apparatus shortly thereafter.

When the pressurized air is initially shut off, the pressurized air from air inlet plenum 32 quickly exits through the opening 52, which has a much larger area than the total size of openings 58. The pressure within air inlet plenum 32 is thus relieved and a small amount of pressurized air from the accumulator chamber 34 begins to bleed back into the air inlet plenum 32 as seen by arrows G. However, once the pressure within air inlet plenum 32 is relieved, the flexible wall member 42 is free to flex downwardly under the pressure of the accumulated air to its natural state as illustrated in FIG. 6. Once the flexible wall member 42 has moved downwardly, a relatively large gap, which is much larger than the total size of openings 58, is formed between the upper edge of inner wall member 44 and the top of wall member 48. The pressurized air which has accumulated within chamber 34 thereafter rushes out through this gap. Since the top wall member 48 is curved downwardly, the air exiting through this gap is directed downward through the conduit formed by inner wall member 44 and through the conduit formed by inner wall member 38, as indicated by arrows H. A certain amount of ambient air (arrows I) is also drawn into these conduits by the rush of pressurized air from the accumulator chamber 34. As seen by arrows J, this air is directed into the hollow interior of the filter element 18. This causes a backwashing of the filter element 18. The particulate matter collected on the outer surface of the filter element 18 is thus dislodged.

The apparatus 10 is particularly useful with shop apparatus such as grinding or drilling machines wherein a fine particulate material is generated. The on-off flow of the pressurized air can be connected to the on and off switch of the shop machine with which the apparatus 10 is used. The particulate material collected on the outer surface of filter element 18 can thus be automatically removed each time the shop machine is shut down. The only power requirement for the apparatus 10 thus would be a shop air line, for example operating at 60 to 100 psi.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

I claim:

1. An air flow inducing and reverse pulse cleaning device for use with particulate material filter elements comprising:

a generally annular shaped air inlet plenum adapted to be located adjacent an outlet of a filter element, said air inlet plenum being defined by an annular bottom wall, a flexible annular wall disposed above said bottom wall, an outer end wall extending between an outer perimeter of said flexible and bottom walls and an inner end wall extending upwardly from said bottom wall, said air inlet plenum having an inlet for receiving pressurized fluid from a source and an outlet formed between an upper end of said inner end wall and said flexible wall for directing the pressurized fluid past said outlet of said filter element;

an accumulator chamber disposed above said air inlet plenum, said chamber being defined by said flexible wall, an inner wall member extending upwardly from an inner end of said flexible wall, an outer wall member extending upwardly from an outer end of said flexible wall, a top wall member, and an outlet gap formed between said top wall member and an uppermost portion of said inner wall member;

at least one bleed hole formed through said flexible wall for diverting to said accumulator chamber a portion of the pressurized fluid supplied to said air inlet plenum;

said flexible wall being movable between an air accumulating position wherein said flexible wall is flexed away from said bottom wall to move said inner wall member into sealing engagement with said top wall member closing said outlet gap during the application of pressurized fluid to said air inlet plenum, and a release position wherein said flexible wall moves to an unflexed state toward said bottom wall when no pressurized fluid is being supplied to said air inlet plenum to move said inner wall member away from said top wall member and allow accumulated pressurized fluid to escape from said accumulator chamber through said outlet gap; and said top wall member being configured to direct accumulated pressurized fluid from said accumulator chamber toward said outlet of said filter element, in a direction reverse to the flow of pressurized fluid from said outlet of said air inlet plenum, when said flexible wall moves to its release position.

2. A device in accordance with claim 1 wherein the area of said at least one bleed hole is substantially less than the area of said outlet from said air inlet plenum.

3. A device in accordance with claim 1 wherein the outer end wall and the inner end wall of said air inlet plenum are generally cylindrical in shape and coaxially arranged with respect to one another, and wherein said outlet from said air inlet plenum is in the form of a ring disposed at the upper end of said cylindrical-shaped inner end wall.

4. A device in accordance with claim 3 wherein the inner wall member of said accumulator chamber is generally cylindrical in configuration and has an increasing diameter along its length in a direction extending away from the outlet of said air inlet plenum, said outer wall member of said air accumulator chamber having a generally truncated conical configuration, said outer wall member extending from an outer perimeter of said flexible wall upwardly and inwardly toward an upper end of said inner wall member, said top wall member being generally ring-shaped and having a downwardly turned lip disposed radially inward of an upper edge of said inner wall member for directing accumulated pressurized fluid from said chamber downwardly through the interior defined by said inner wall member of said accumulator chamber and said inner wall of said air inlet plenum to an interior of a filter element.

5. A device in accordance with claim 4 wherein the bottom wall and the inner end and outer end walls of said air inlet plenum are formed of a single integral piece of material, said flexible wall and said inner wall member of said accumulator chamber being formed of a second single integral piece of material, and said outer wall member and top wall member of said accumulator chamber being formed of a third single integral piece of material.

6. A device in accordance with claim 1 wherein the area of said outlet gap is substantially greater than the area of said at least one bleed hole.

7. An air cleaning apparatus comprising:
a housing having an inner surface defining a boundary of a filtering chamber and air inlet for passing air to be cleaned into said filtering chamber;
a hollow filter element supported in said housing, said filter element being comprised of porous media having an outer surface defining another boundary of said filtering chamber and upon which material to be filtered is deposited, said filter element having an outlet opening in communication with its hollow interior through which filtered air is passed;
means for inducing air flow through said filtering chamber and filter element to said outlet opening and for inducing a reverse pulse of air to remove material from the outer surface of said porous media;
said inducing means including an air inlet plenum having an inlet for receiving pressurized fluid from a source and a venturi section comprising a ring-shaped outlet for directing the pressurized fluid past the outlet opening from said filter element to induce the flow of particulate laden air through said filter element, an accumulator chamber for storing a portion of the pressurized fluid being supplied said accumulator chamber having an air outlet gap bleed means for diverting a portion of the pressurized fluid from said air inlet plenum to said accumulator chamber, and means for blocking the flow of the pressurized fluid accumulated in said accumulator chamber while the pressurized fluid is being supplied to the air inlet plenum, and for releasing the accumulated pressurized fluid from said accumulator chamber when the pressure within said air inlet plenum is relieved, in a direction reverse to the direction of flow of the pressurized fluid from the outlet of said air inlet plenum, to backwash particulate material from the outer surface of said porous media.

8. An apparatus in accordance with claim 7 wherein said air inlet plenum is generally annular-shaped and is defined by an annular bottom wall, a flexible annular wall disposed above said bottom wall, an outer end wall extending between an outer perimeter of said flexible and bottom walls and an inner end wall extending upwardly from said bottom wall, said ring-shaped outlet from said air inlet plenum being formed between an upper end of said inner end wall and said flexible wall.

9. An apparatus in accordance with claim 8 wherein said accumulator chamber is disposed above said air inlet plenum and is defined by said flexible wall, an inner wall member extending upwardly from an inner end of said flexible wall, an outer wall member extending upwardly from an outer end of said flexible wall, a top wall member, and said outlet gap formed between said top wall member and said inner wall member, said bleed means including at least one bleed hole formed through said flexible wall, and said blocking and releasing means including said flexible wall being movable between an air accumulating position wherein said flexible wall is flexed away from said bottom wall to move said inner wall member into sealing engagement with said top wall member during the application of pressurized fluid to said air inlet plenum, and a release position wherein said flexible wall moves to an unflexed state toward said bottom wall, when no pressurized fluid is being supplied to said air inlet plenum, to move said inner wall member away from said top wall member and allow accumulated pressurized fluid to escape from said accumulator chamber through said outlet gap.

10. A device in accordance with claim 9 wherein the outer end wall and the inner end wall are generally cylindrical in shape and coaxially arranged with respect to one another, and wherein said ring-shaped outlet from the air inlet plenum is disposed at the upper end of said cylindrical-shaped inner end wall.

11. An apparatus in accordance with claim 10 wherein the inner wall member of said accumulator chamber is generally cylindrical in configuration and has an increasing diameter along its length in a direction extending away from said outlet of said air inlet plenum, said outer wall member of said air accumulator chamber having a generally truncated conical configuration, said outer wall member extending from an outer perimeter of said flexible wall upwardly and inwardly toward an upper end of said inner wall member, said top wall member being generally ring-shaped and having a downwardly turned lip disposed radially inward of an upper edge of said inner wall member for directing accumulated pressurized fluid from said chamber outlet gap downwardly through the interior defined by said inner wall member of said accumulator chamber and said inner end wall of said air inlet plenum into the hollow interior of said filter element.

12. An apparatus in accordance with claim 11 wherein said bottom wall and said inner end and outer end walls of said air inlet plenum are formed of a single integral piece of material, said flexible wall and said inner wall member of said accumulator chamber being formed of a second single integral piece of material, and said outer wall member and top wall member of said accumulator chamber being formed of a third single integral piece of material.

13. An apparatus in accordance with claim 12 wherein the area of said ring-shaped outlet from said air inlet plenum is substantially greater than the area of said at least one bleed hole, and the area of said outlet gap is substantially greater than the area of said at least one bleed hole.

* * * * *

UNITED STATES PATENT AND TRADEMARK OFFICE
CERTIFICATE OF CORRECTION

PATENT NO. : 4,299,604
DATED : November 10, 1981
INVENTOR(S) : David L. Brenholt It is certified that error appears in the above—identified patent and that said Letters Patent is hereby corrected as shown below:

Column 7, line 45, "gap" should be --gap,--.

Signed and Sealed this

Twentieth Day of April 1982

|SEAL|

Attest:

GERALD J. MOSSINGHOFF

Attesting Officer    Commissioner of Patents and Trademarks